(12) United States Patent
Honda et al.

(10) Patent No.: US 11,774,412 B2
(45) Date of Patent: Oct. 3, 2023

(54) FIELD FLOW FRACTIONATION DEVICE INCLUDING MASS BALANCER PORTION

(71) Applicant: SHIMADZU CORPORATION, Kyoto (JP)

(72) Inventors: Hiroki Honda, Kyoto (JP); Kengo Aoki, Kyoto (JP); Haruhisa Kato, Tsukuba (JP)

(73) Assignee: SHIMADZU CORPORATION, Kyoto (JP)

( * ) Notice: Subject to any disclaimer, the term of this patent is extended or adjusted under 35 U.S.C. 154(b) by 997 days.

(21) Appl. No.: 16/471,637

(22) PCT Filed: Dec. 22, 2016

(86) PCT No.: PCT/JP2016/088346
§ 371 (c)(1),
(2) Date: Jun. 20, 2019

(87) PCT Pub. No.: WO2018/116445
PCT Pub. Date: Jun. 28, 2018

(65) Prior Publication Data
US 2019/0317058 A1    Oct. 17, 2019

(51) Int. Cl.
*G01N 30/00*    (2006.01)
*B03B 5/28*    (2006.01)
(Continued)

(52) U.S. Cl.
CPC ........... *G01N 30/0005* (2013.01); *B03B 5/28* (2013.01); *B04B 5/0442* (2013.01); *B04B 9/14* (2013.01);
(Continued)

(58) Field of Classification Search
CPC .......... G01N 30/0005; G01N 2030/002; B03B 5/28; B04B 5/0442; B04B 9/14; B04B 2005/045
(Continued)

(56) References Cited

U.S. PATENT DOCUMENTS 2,256,951 A * 9/1941 Van Riel ................. B04B 11/04
494/59
4,448,679 A    5/1984 Dilks, Jr. et al.
(Continued)

FOREIGN PATENT DOCUMENTS

EP          2 524 732 A1    11/2012
WO    WO-2021140935 A1 *  7/2021

OTHER PUBLICATIONS

Written Opinion for PCT/JP2016/088346, dated Feb. 28, 2017.
International Search Report for PCT/JP2016/088346, dated Feb. 28, 2017.

*Primary Examiner* — Charles Cooley
(74) *Attorney, Agent, or Firm* — Sughrue Mion, PLLC (57) ABSTRACT

A centrifugal separation type FFF device where a rotor can be rotated at a high speed safely so that particles of a smaller size in a sample liquid can be classified. A field flow fractionation device is provided with: a channel that is attached to the inner circumferential surface of the peripheral portion of a rotor and where a classification flow path is created; flow paths for feeding a sample liquid into and out from the classification flow path; and a rotational drive mechanism for rotating the rotational axis, wherein a channel installation portion is formed on one side of the peripheral portion, and a mass balancer portion for adjusting the mass distribution of the rotor is formed on the other side with the rotor base in between.

4 Claims, 9 Drawing Sheets

(51) Int. Cl.
    *B04B 5/04*     (2006.01)
    *B04B 9/14*     (2006.01)

(52) U.S. Cl.
    CPC .. *B04B 2005/045* (2013.01); *G01N 2030/002* (2013.01)

(58) Field of Classification Search
    USPC .......................................................... 494/82
    See application file for complete search history.

(56) References Cited

U.S. PATENT DOCUMENTS

| | | | | |
|---|---|---|---|---|
| 4,502,839 | A * | 3/1985 | Maddox | F01D 1/02 |
| | | | | 415/90 |
| 7,442,315 | B2 * | 10/2008 | Cardot | B04B 5/0442 |
| | | | | 210/360.2 |
| 11,389,806 | B2 * | 7/2022 | Aoki | B04B 1/02 |
| 11,433,404 | B2 * | 9/2022 | Aoki | G01N 30/0005 |
| 2019/0317058 | A1 * | 10/2019 | Honda | B04B 9/14 |
| 2019/0358648 | A1 * | 11/2019 | Aoki | B04B 11/02 |
| 2019/0358649 | A1 * | 11/2019 | Aoki | G01N 1/10 |
| 2019/0381519 | A1 * | 12/2019 | Aoki | B04B 7/00 |
| 2020/0001308 | A1 * | 1/2020 | Aoki | G01N 30/0005 |
| 2023/0034246 | A1 * | 2/2023 | Aoki | B04B 7/06 |
| 2023/0037872 | A1 * | 2/2023 | Aoki | G01N 1/10 |

\* cited by examiner

FIELD FLOW FRACTIONATION DEVICE INCLUDING MASS BALANCER PORTION

CROSS REFERENCE TO RELATED APPLICATIONS

This Application is a National Stage of International Application No. PCT/JP2016/088346 filed Dec. 22, 2016.

TECHNICAL FIELD

The present invention relates to a centrifugal separation type field flow fractionation device (hereinafter, referred to as an FFF device) where a liquid that includes a group of microscopic particles is allowed to pass through a channel that is rotating at a high speed so that the microscopic particles in the liquid are classified into groups of the respective particle sizes by means of the centrifugal force.

BACKGROUND ART

Preliminary treatment for classifying particles in a sample liquid in accordance with the particle diameters is sometimes carried out before analysis. In such a case, an FFF device is used as a preliminary treatment device for the classification in accordance with the particle sizes.

Different separation techniques are used for different types of FFF devices, which are referred to as a crossflow type, a temperature distribution type, an electrical field type and a centrifugal separation type, and an appropriate type is selected for use in accordance with the characteristics of the liquid or the particles that are to be separated. From among these types, the centrifugal separation type uses the centrifugal force field of a rotor that rotates at a high speed, which makes it possible to classify particles without being electrically or thermally affected, and thus has been used for a long time (see Patent Literatures 1 through 3).

Figure 6:
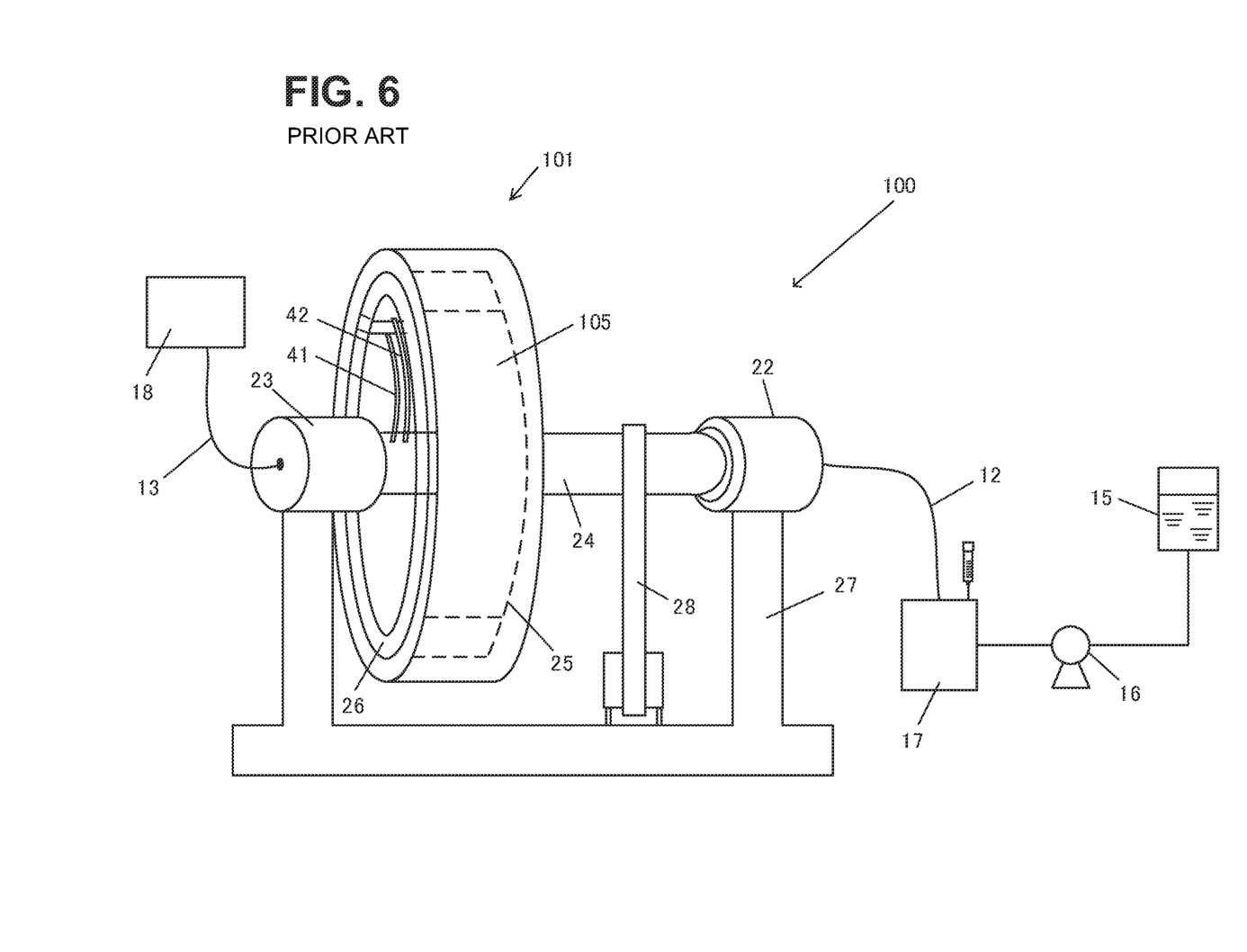
FIG. 6 is a schematic diagram showing the configuration of an analysis system using an FFF device according to the prior art.

FIG. 6 is a diagram showing a schematic configuration of an analysis system using a centrifugal separation type FFF device according to the prior art. This analysis system is similar to the analysis system described in Patent Literature 1, for example.

An analysis system 100 is provided with a centrifugal separation type FFF device 101, an external supply flow path 12 for feeding a sample liquid that includes microscopic particles into the FFF device 101, and an external discharge flow path 13 for feeding the sample liquid out from the FFF device 101 into an analysis device.

The external supply flow path 12 is arranged in such a manner that the solvent stored in a solvent tank 15 is fed by means of a liquid feeding pump 16 into a sample introduction unit 17 where a sample that includes microscopic particles to be measured is injected into the solvent so as to provide a sample liquid, which is then fed into the FFF device 101.

The external discharge flow path 13 is arranged in such a manner that the sample liquid is fed out from the FFF device 101 into an analysis device 18 (a spectrophotometer, for example).

Figure 7:
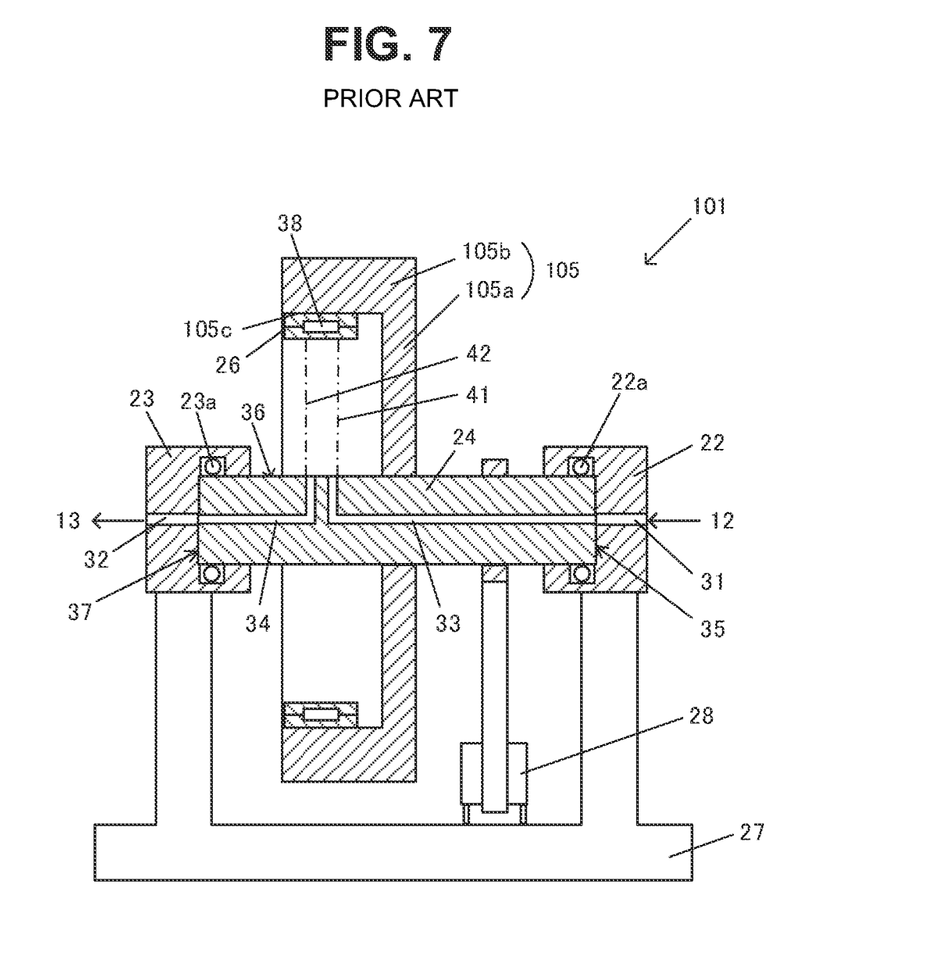
FIG. 7 is a schematic cross-sectional diagram showing the FFF device in FIG. 6.

FIG. 7 is a schematic cross-sectional diagram showing a centrifugal separation type FFF device 101. The FFF device 101 is provided with a pair of fixed axes 22 and 23, left and right, a rotational axis 24, a rotor 105, a channel 26, a support base 27 and a rotation drive mechanism 28.

The fixed axes 22 and 23 are supported by the support base 27. The two ends, left and right, of the rotational axis 24 are supported by bearings 22a and 23a that are fitted in the fixed axes 22 and 23 so as to make high speed rotation possible by means of the rotation drive mechanism 28.

A flow path 31 is formed in the fixed axis 22 on the right side, a flow path 32 is formed in the fixed axis 23 on the left side, a flow path 33 is formed in the rotational axis 24 on the side close to the fixed axis 22, and a flow path 34 is formed in the rotational axis 24 on the side close to the fixed axis 23.

The flow path 33 is formed in such a manner that one end has an opening at the center of the end surface 35 of the rotational axis 24 on the right side, the flow path 33 extends along the axis line, which becomes the rotation center, through the inside of the rotational axis 24 and bends on the way, and the other end opens on the side surface 36 of the rotational axis 24.

The flow path 34 is formed in such a manner that one end has an opening at the center of the end surface 37 of the rotational axis 24 on the left side, the flow path 34 extends along the axis line, which becomes the rotation center, through the inside of the rotational axis 24 and bends on the way, and the other end opens on the side surface 36 of the rotational axis 24.

One end of the flow path 31 is connected to the external supply flow path 12, and the other end is connected to the flow path 33. In addition, one end of the flow path 32 is connected to the external discharge flow path 13, and the other end is connected to the flow path 34. The portion through which the flow path 31 and the flow path 33 are connected and the portion through which the flow path 32 and the flow path 34 are connected have a liquid tight structure, which is a sealed structure using a well-known mechanical sealing or oil sealing. Though the detailed description about the sealing structure is omitted, an example is disclosed in each of Patent Literatures 1 through 3, for example, and there are no particular limitations concerning the sealing structure.

The rotor 105 is fixed to and supported by the side 36 (surface around the cylinder) of the rotational axis 24, and is integrally formed of a rotor base 105a in a disc form that spreads in the direction of the radius and a peripheral portion 105b in a cylindrical form that extends in the direction of the axis with the outer periphery of the circular rotor base 105a being the base end in such a manner that the rotor 105 is a body of rotation with the cross-section along the direction of the axis being in a C shape. The rotor 105 is in a C shape in the cross-section so that the below-described channel 26 can be supported in the state where the centrifugal force is applied to the rotor 105, and at the same time, the channel 26 can be easily removed or attached.

Figure 8:
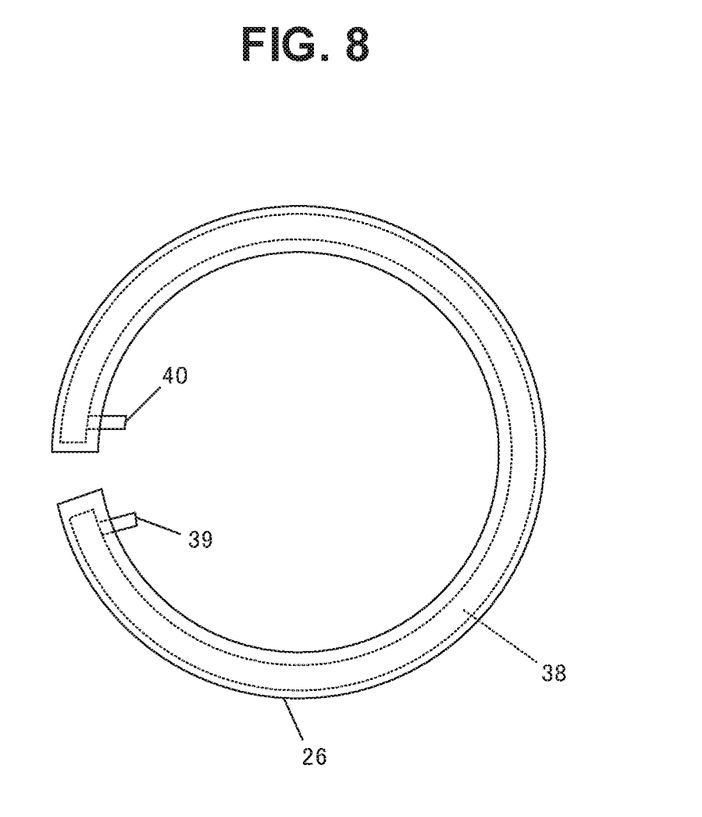
FIG. 8 is a front diagram showing the channel.

The channel 26 is fixed to the peripheral portion 105b along the inner circumferential surface 105c. FIG. 8 is a front diagram showing the channel 26 that has been removed. The channel 26 is formed of a tube body in a C shape where a flow path 38 in a C shape that is almost annular is formed inside with an inlet 39 of the flow path 38 being at one end and an outlet 40 of the flow path 38 being at the other end. A fixed member (not shown) is inserted into the notched portion between the two ends of the channel 26 (between the inlet 39 and the outlet 40) so that the channel 26 in a C shape is pushed and spread in order to make close contact with the inner circumferential surface 105c.

The inlet 39 and the outlet 40 are respectively connected to the flow paths 33 and 34 of the rotational axis 24 through connection tubes 41 and 42.

Thus, the FFF device 101 is formed in such a manner that a sample liquid flows through the external supply flow path 12, the flow path 31, the flow path 33, the connection tube 41, the flow path 38, the connection tube 42, the flow path 34, the flow path 32 and the external discharge flow path 13 in this order.

When a group of microscopic particles in a sample liquid is classified by means of the FFF device 101, the sample liquid is supplied from the external supply flow path 12, and at the same time, the rotor 105 is rotated at a high speed by the rotation drive mechanism 28. Then, a centrifugal force is applied to the particles in the sample liquid that flows through the flow path 38 within the channel 26 in such a manner that the force works to push the particles against the wall surface of the flow path 38 on the outer periphery side. At this time, large (or heavy) particles receive a stronger centrifugal force than small (or light) particles so that the larger the particles are, the stronger they are pushed against the flow path 38 on the outer peripheral wall side, and as a result, small particles flow through the region of the flow path 38 closer to the center side instead of large particles, whereas the large particles flow through the region on the outer peripheral wall side.

Meanwhile, the flow path 38 of the channel 26 is formed in such a manner that the stream profile forms streams in a parabola, and therefore, the speed of the flow is faster in the center region of the flow path 38, and the closer the region is to the outer peripheral wall side of the flow path 38, the slower the flow is.

Therefore, when a centrifugal force is applied to the sample liquid, small particles that flow through the flow path 38 on the center region side flow out from the channel 26 before the large particles that flow through the region that is close to the outer peripheral wall surface of the flow path 38. As a result of this action, the small particles that flow through the channel 26 flow out first, and after that, the large particles flow out, and thus, the particles in the liquid can be classified in accordance with the particle sizes.

As described above, particles can be classified when a centrifugal force is applied to the flow path 38 within the channel 26, and therefore, the flow path 38 is referred to as a "classification flow path."

In addition, the flow path 31, the flow path 33 and the connection tube 41 for supplying a sample liquid to the classification flow path within the FFF device 101 are collectively referred to as a "supply flow path," and the connection tube 42, the flow path 34 and the flow path 32 for discharging the sample liquid from the classification flow path within the FFF device 101 are collectively referred to as a "discharge flow path."

CITATION LIST

Patent Literature

Patent Literature 1: U.S. Pat. No. 4,448,679
Patent Literature 2: U.S. Pat. No. 7,442,315
Patent Literature 3: European Patent Application 2524732

SUMMARY OF THE INVENTION

1. Technical Problem

In recent years, objects to be analyzed have been verified in such a manner that samples that include particles of which the particle size is smaller than before and as small as the size of nanometers (10 nm to 100 nm) are analyzed. Even for the analysis of particles of a size of nanometers, a method for classifying the sample liquid by using a centrifugal separation type FFF device before detection is used, and thus, it has been desired to classify nanoparticles, of which the diameter is smaller than before, as the size of the particles becomes smaller. In this case, it is necessary to apply a centrifugal force to the smaller particles so as to press them against the outer peripheral wall side, and it becomes necessary to classify the particles to which a centrifugal force that is greater than before is applied.

In general, the centrifugal force F to be applied to the particles in a sample liquid that passes through the channel in an FFF device can be represented by the following formula (1):

$$F = m(1-\rho/\rho s)r\omega^2 \qquad (1)$$

where m is the mass of the particles, $\rho$ is the density of the solvent, $\rho s$ is the density of the particles, r is the radius of the channel, and $\omega$ is the angular speed (rotational speed).

In order to apply a greater centrifugal force, it is necessary to either increase the rotor radius r or the rotational speed $\omega$. When the rotor radius r is increased, however, the device becomes larger in scale and heavier. In order to avoid this, the rotor may be made to rotate at a high speed in such a manner that the angular speed $\omega$ can be increased as much as possible.

Figure 9:
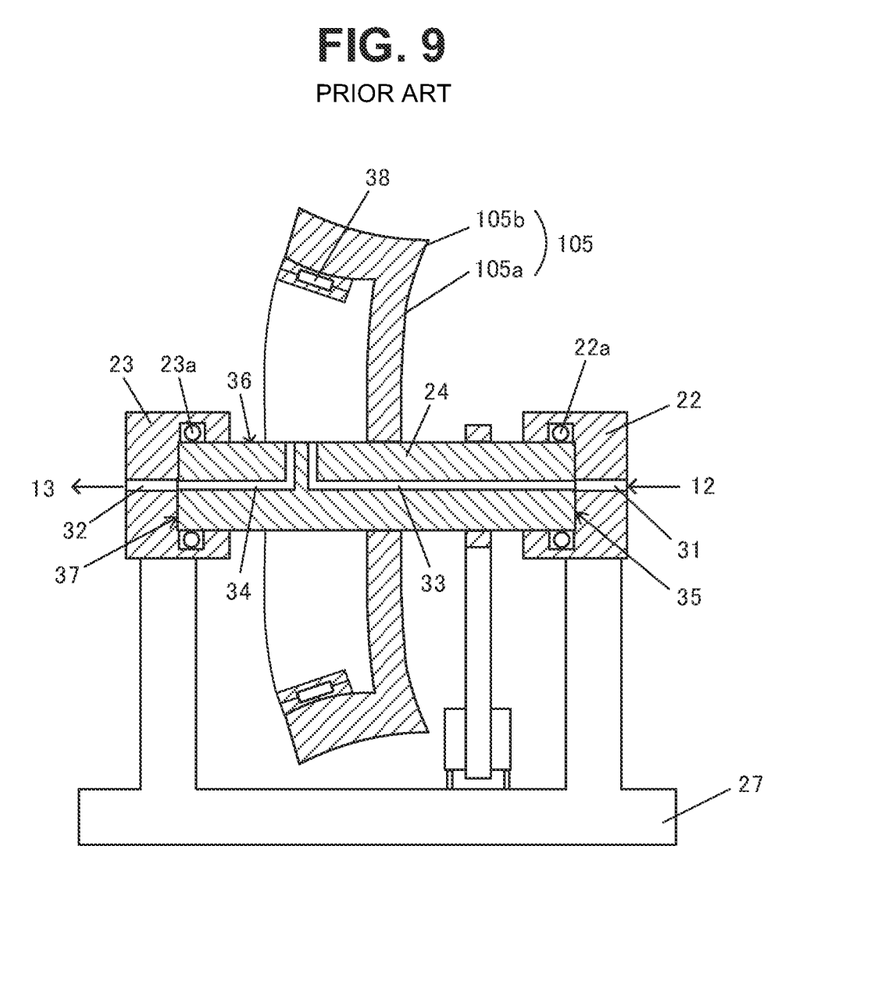
FIG. 9 is a diagram showing the state of a rotor of which the form has been changed at the time of high-speed rotation.

In the conventional FFF device 101 shown in FIGS. 6 and 7, however, the peripheral portion 105b (including the channel 26) is greatly changed in form due to the effects of the centrifugal force when the angular speed (rotational speed) is increased. FIG. 9 is a diagram showing the state of the rotor of which the form has changed at the time of high-speed rotation. Here, the exaggerated state of the changed form is shown for the purpose of convenience of the description. The peripheral portion 105b has a cantilever structure where one end is supported by the rotor base 105a. Upon the reception of a centrifugal force, the moment of the force works so as to spread the side of the peripheral portion 105b that is away from the rotor base 105a towards the outside, and thus, the peripheral portion 105b is bent, and furthermore, the rotor base 105a is also bent towards the fixed axis 22 side due to the effects of the bending of the peripheral portion 105b. As a result, the flow path 38 (classification flow path) is inclined relative to the axis direction, which makes the distribution of the centrifugal force applied to the flow path 38 unstable, and thus, the precision of the classification of the particles that pass through the flow path 38 is lowered.

When the amount of bending of the peripheral portion 105b increases to exceed the limit, there sometimes is a risk of the rotor 105 being broken.

Though the thickness of the rotor 105 can be increased in order to prevent the form of the rotor from being changed due to the high gravitational field created by the high-speed rotation, the weight of the rotor becomes heavier, which makes it impossible to avoid an increase in the scale and the weight of the device.

Therefore, there is a limitation in the increase of the centrifugal force in the conventional FFF device, which makes it difficult to classify smaller particles. Typically, approximately 5000 rpm (approximately 2800 G when represented by the dimensions of the centrifugal force) is the limitation of the rotational speed when the radius of the peripheral portion 105b is approximately 10 cm (20 cm in diameter).

In order for the rotor of which the radius is approximately 10 cm in the device that is not of a large scale to classify the particles of which the size is approximately up to 10 nm with high precision, approximately 5000 rpm provides insufficient centrifugal force, and it is desirable for the rotational speed to be increased up to approximately 10,000 rpm (approximately 10,000 G when represented by the dimensions of the centrifugal force).

An object of the present invention is to provide a centrifugal separation type FFF device where it is made possible to rotate the rotor (and channel) at a high speed safely so that particles of a smaller size can be classified with higher precision as compared to the conventional FFF device.

2. Solution to Problem

In order to solve the above-described problem, the present invention provides a field flow fractionation device with: a rotor having: a rotor base that is supported by a rotational axis, that spreads in the direction of the diameter from the above-described rotational axis, and has a circular outer periphery; and a peripheral portion that is provided along the outer periphery of the above-described rotor base and where an inner circumferential surface that is parallel to the direction of the axis line of the above-described rotational axis is formed; a channel that is attached to the inner circumferential surface of the above-described peripheral portion and where a classification flow path for causing field flow fractionation by means of a centrifugal force is created; a supply flow path for feeding a sample liquid into the above-described classification flow path; a discharge flow path for feeding a sample liquid out from the above-described classification flow path; and a rotational drive mechanism for rotating the above-described rotational axis, wherein a channel installation portion having the above-described inner circumferential surface formed is formed on one side of the peripheral portion of the above-described rotor, and a mass balancer portion for adjusting the mass distribution of the above-described rotor is formed on the other side with the above-described rotor base in between, and the mass of the above-described mass balancer portion is adjusted in such a manner that the mass distribution of the rotor is equal between the left and the right with the above-described rotor base in between in the state where the above-described channel is attached to the above-described channel installation portion.

3. Advantageous Effects of the Invention

In the present invention, the mass on the mass balancer portion side is adjusted so that the mass distribution of the rotor becomes equal between the left and right with the rotor base in between in the state where the channel is attached to the channel installation portion on one side of the rotor. Therefore, even when the rotor rotates at a high speed so that a strong centrifugal force is applied, the moment of the force that is applied on the channel installation portion side and the moment of the force that is applied on the weight balancer portion side cancel each other out, and therefore, the bending of the rotor base is reduced, and the classification flow path of the channel can be prevented from being changed in the form in the direction of the axis line. Furthermore, the form of the rotor can be prevented from being changed, and therefore, a device that can withstand a large centrifugal force can be provided without being large scaled.

Furthermore, in the invention, the thickness of the peripheral portion can be distributed in the direction of the axis in such a manner that the center is thicker and the left and right ends are thinner. Consequently, the centrifugal force applied to the left and right ends of the peripheral portion where the thickness is reduced is lowered, and thus, stress applied to the connection portion caused by the bending of the peripheral portion due to the centrifugal force is reduced. As a result, the strength of the border portion (connection portion) between the rotor base and the peripheral portion can be increased. Furthermore, the secondary moment in the cross-section of the rotor becomes smaller as compared to the case where the thickness is uniform, and therefore, the rotor can be driven more efficiently (or the rotational drive mechanism can be miniaturized), and thus, an increase in the scale or the weight of the device can be avoided.

DESCRIPTION OF EMBODIMENTS

Figure 1:
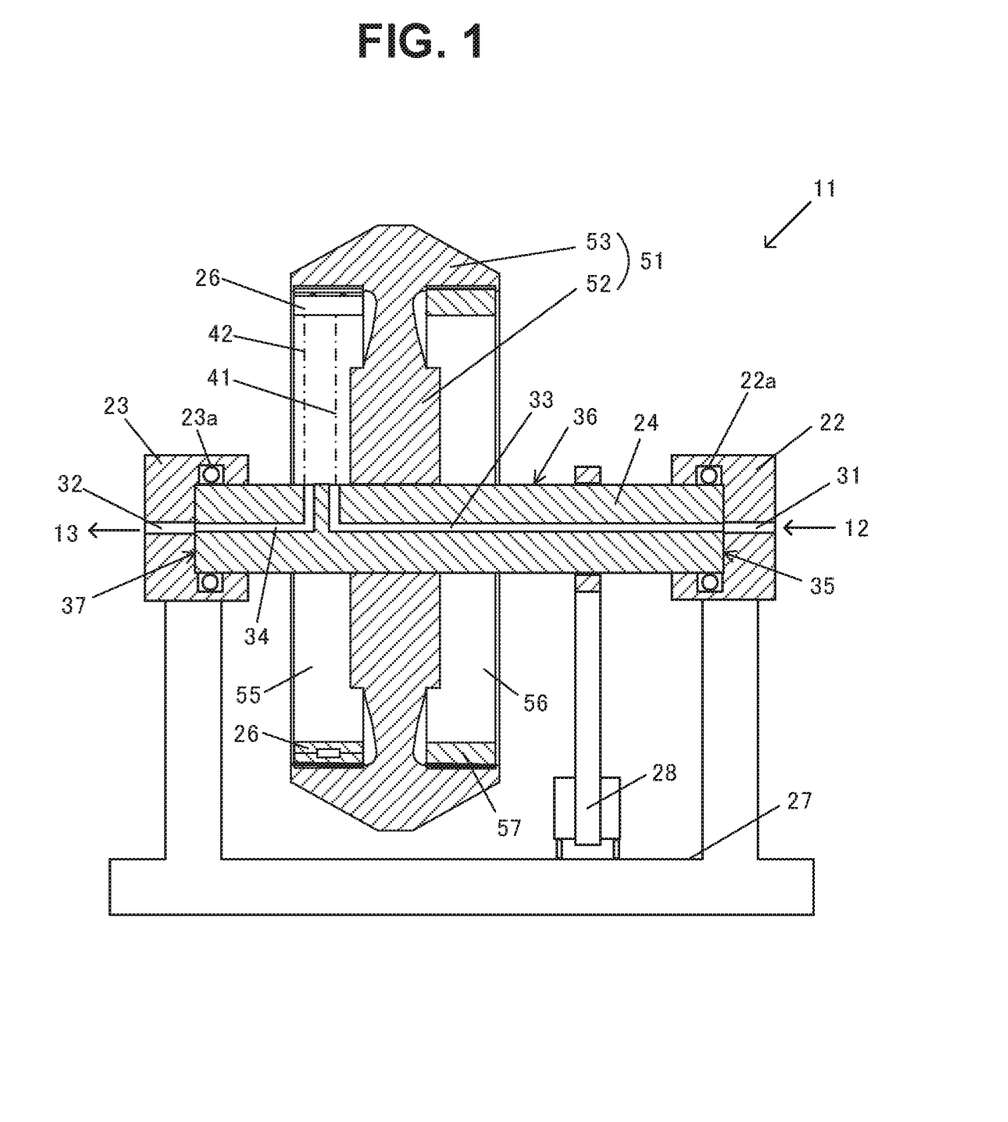
FIG. 1 is a cross-sectional diagram showing the FFF device according to one embodiment of the present invention.

In the following, the embodiments of the present invention are described in reference to the drawings. FIG. 1 is a cross-sectional diagram showing the FFF device 11 according to one embodiment of the present invention. The FFF device 11 can be used, for example, in an analysis system that is similar to the analysis system 100 that is described in the above in reference to FIG. 6.

The FFF device 11 is different from the FFF device 101 shown in FIGS. 6 and 7 in the structure of the rotor. The FFF device 11 is provided with a rotor 51 which is different from the rotor 105 in the FFF device 101. The same symbols are attached to the same components other than the rotor 51 in order to avoid the repetition of the same description.

Figure 2:
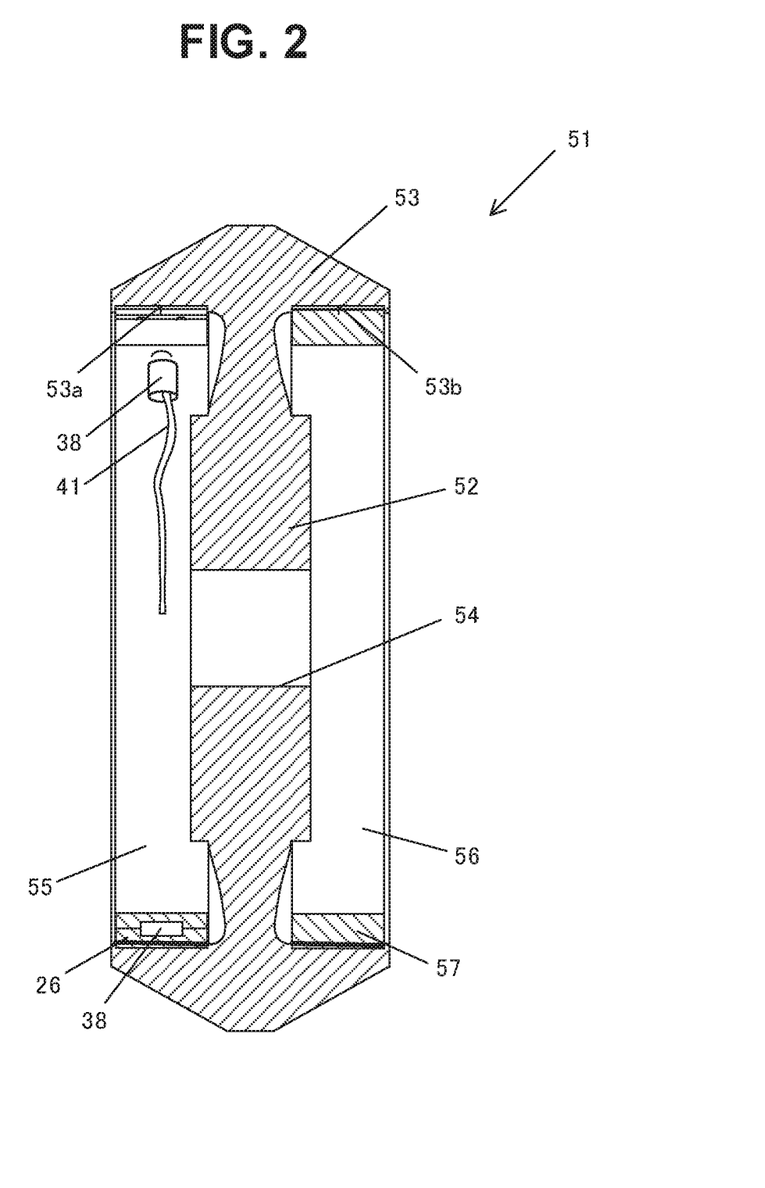
FIG. 2 is a cross-sectional diagram showing the rotor in FIG. 1.
Figure 3:
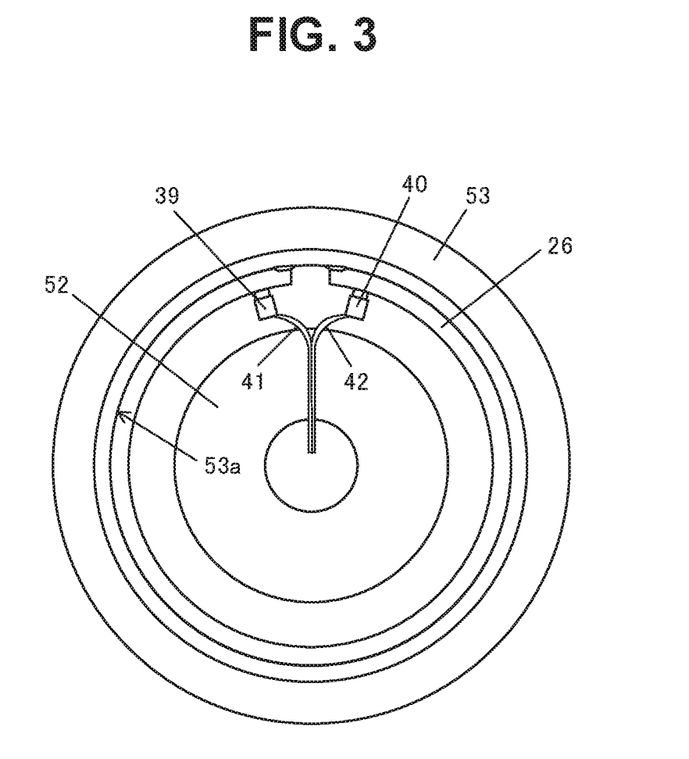
FIG. 3 is a front diagram showing the rotor in FIG. 1.

FIG. 2 is a cross-sectional diagram showing the rotor 51, and FIG. 3 is a front diagram. The rotor 51 has a structure that is symmetrical between the left and the right, where a rotor base 52 in a disc form and a peripheral portion 53, where a rim having inner circumferential surfaces 53a and 53b that are parallel to the direction of the axis line of the rotor 51 is formed along the outer periphery of the disc of the rotor base 52 on the left and right sides, are integrally formed. With the rotor base 52 in between, one side (left side) is used as a channel installation portion 55, and the other side (right side) is used as a mass balancer portion 56.

A channel 26 in a C shape (see FIG. 5) is fixed to the channel installation portion 55 along the inner circumferential surface 53a. A classification flow path 38 is created inside the channel 26. The inlet 39 of the classification flow path 38 is connected to a flow path 33 via a connection tube 41, and the outlet 40 is connected to a flow path 34 via a connection tube 42.

Meanwhile, an annular dummy ring 57 (balance member) having a mass equal to that of the channel 26 that is attached to the channel installation portion 55 is fixed to the mass balancer portion 56. Here, a dummy ring of which the structure is identical to that of the channel 26 may be used instead of the dummy ring 57. In the latter case, it is desirable for the dummy ring to be filled with a dummy liquid, and for the inlet 39 and the outlet 40 to be plugged and closed in order to prevent a difference from being caused by the mass of the fluid that flows through the classification flow path 38.

Figure 4A:
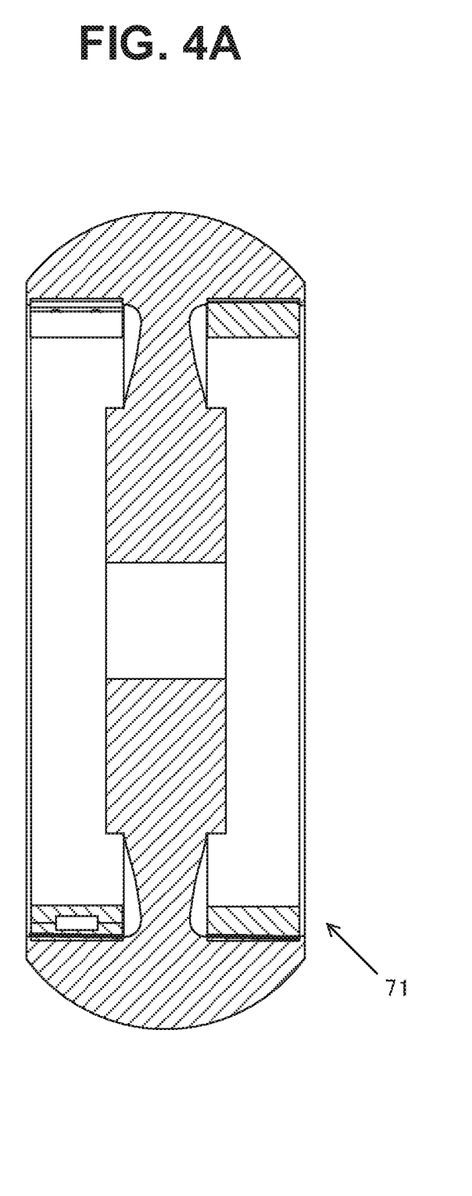
FIGS. 4(a) and 4(b) are diagrams showing modifications of the peripheral portion in the form in the cross-section.
Figure 4B:
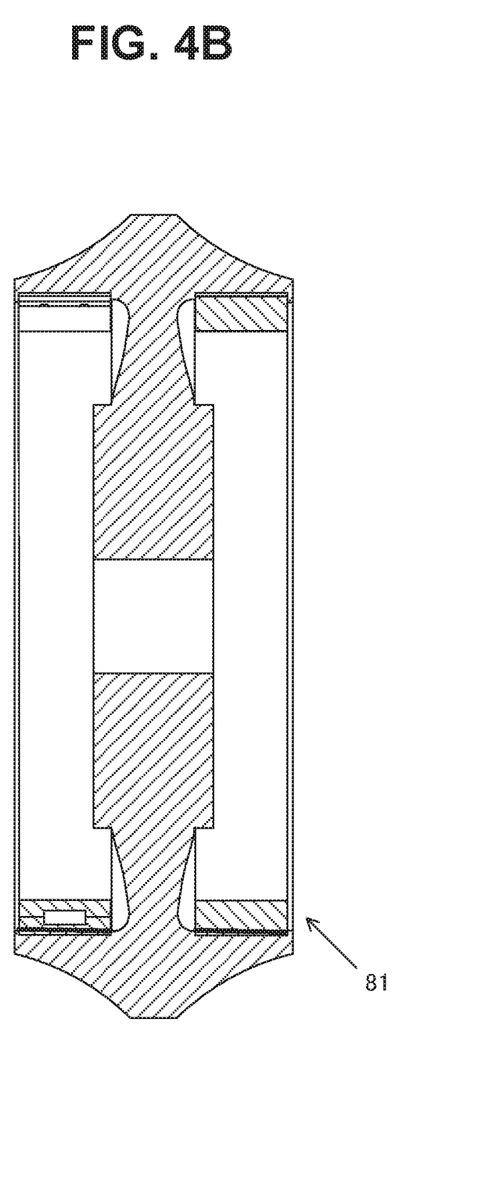

The thickness of the peripheral portion 53 in the direction of the diameter differs in the distribution along the direction of the axis, and the peripheral portion 53 has a cross-section in a mountain shape on the outer peripheral surface side in such a manner that the center is thicker and the two sides, left and right, are thinner. As for a rotor having such a cross-sectional form where the thickness of the peripheral portion 53 is greater at the center and the thickness at the left and right ends is smaller, such a variation as the rotor 71 or 81 in FIG. 4, for example, is possible, and therefore, an appropriate selection may be made.

Next, the operation of the FFF device 11 where the rotor 51 is used is described. When the rotor 51 is rotated at a high speed, a centrifugal force that is represented by formula (1) is also applied to the peripheral portion 53 of the rotor 51. The moment of the force due to the centrifugal force applied to the peripheral portion 53 is mutually cancelled out between the channel installation portion 55 side and the mass balancer portion 56 side with the rotor base 52 in between. Therefore, the bending of the rotor base 52 can be reduced, and the phenomenon where the channel 26 is shifted from the position that is parallel to the direction of the axis line caused by the bending of the rotor base 52 can be prevented.

Though the peripheral portion 53 on the channel installation portion 55 side has a cantilever structure in the connection portion with the rotor base 52, the thickness of the peripheral portion 53 is smaller at the left end in such a manner that the mass thereof is smaller, and therefore, the stress applied to the connection portion caused by the bending of the peripheral portion due to the centrifugal force becomes smaller, and thus, the strength of the border portion (connection portion) between the rotor base and the peripheral portion can be increased. In addition, the secondary moment in the cross-section of the rotor is smaller as compared to the case where the thickness of the peripheral portion 53 is uniform, and thus, the rotor can be driven more efficiently.

Figure 5:
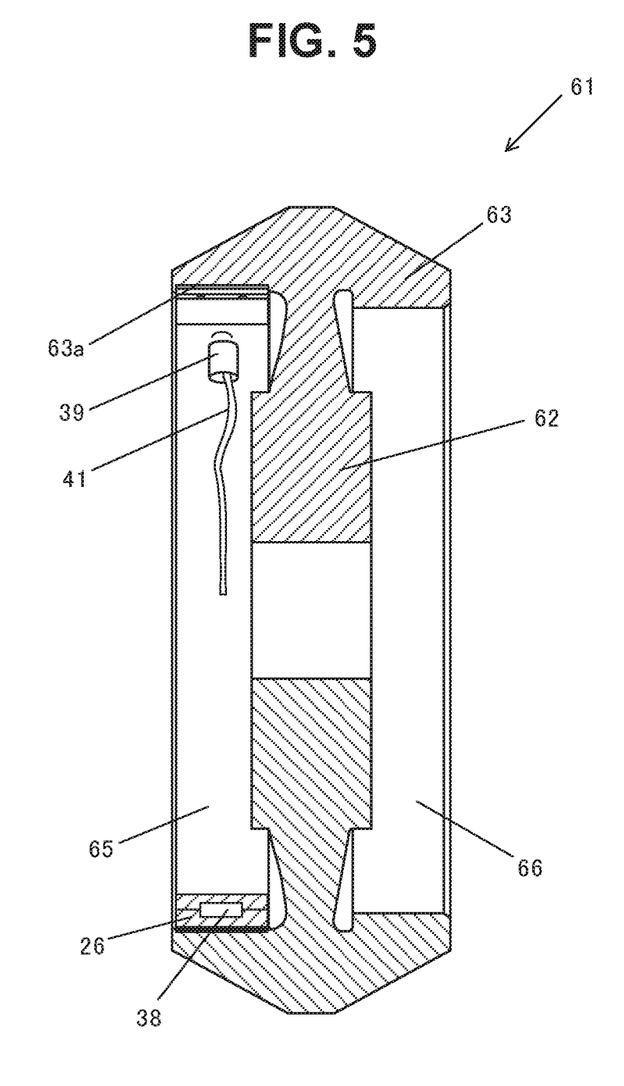
FIG. 5 is a cross-sectional diagram showing the rotor according to another embodiment of the present invention.

FIG. 5 is a cross-sectional diagram showing the rotor 61 according to another embodiment of the present invention. The rotor 61 can be substituted with the rotor 51 for use in the FFF device 11 in FIG. 1.

The rotor 61 has a structure where a rotor base 62 in disc form and a peripheral portion 63 along the circular outer periphery of the rotor base 62 are integrally formed. One side (left side) of the rotor 61 is used as a channel installation portion 65, and the other side (right side) is used as a mass balancer portion 66. An inner circumferential surface 63a that is parallel to the direction of the axis line is formed in the channel installation portion 65, and a channel 26 (see FIG. 8) is fixed along the inner circumferential surface 63a. A classification flow path 38 is created inside the channel 26, and in the same manner as in the rotor 51, the inlet 39 of the classification flow path 38 is connected to the flow path 33 via the connection tube 41, and the outlet 40 (not shown) is connected to the flow path 34 via the connection tube 42 (not shown).

Meanwhile, the thickness of the peripheral portion 63 of the mass balancer portion 66 is greater than the thickness of the channel installation portion 65 so that the mass balancer portion 66 has a mass that is equivalent to the sum of the mass of the channel 26 and the channel installation portion 65, and thus, the rotor 61 has a structure that is asymmetrical between the left and the right.

When the rotor 61 rotates at a high speed, the moment of the force is cancelled out between the left and the right of the rotor base 62 in order to prevent the rotor base 62 from bending. In addition, the thickness of the peripheral portion 63 is greater at the center in the cross-section, and the thickness is smaller at the left and right ends so that the stress applied to the connection portion can be reduced, and the strength of the border portion (connection portion) between the rotor base and the peripheral portion can be increased. In this case as well, the secondary moment in the cross-section of the rotor is smaller as compared to the case where the thickness of the peripheral portion 63 is uniform in the direction of the axis, and thus, the rotor can be driven more efficiently.

The present invention is not limited to the above-described embodiments, and it goes without saying that various modifications are included as long as the gist of the present invention is not deviated from.

INDUSTRIAL APPLICABILITY

The present invention can be applied to centrifugal separation type FFF devices.

REFERENCE SIGNS LIST

11 FFF device
22, 23 fixed axis
24 rotational axis
26 channel
28 rotational drive mechanism
31, 33, 41 supply flow path
38 classification flow path
32, 34, 42 discharge flow path
51 rotor
52 rotor base
53 peripheral portion
53a inner circumferential surface
55 channel installation portion
56 mass balancer portion
57 dummy ring
61 rotor
62 rotor base
63 peripheral portion
63a inner circumferential surface
65 channel installation portion
66 mass balancer portion

The invention claimed is:

1. A field flow fractionation device, comprising:
a rotor having: a rotor base that is supported by a rotational axis, that spreads in the direction of the diameter from said rotational axis, and has a circular outer periphery; and a peripheral portion that is provided along the outer periphery of said rotor base and where an inner circumferential surface that is parallel to the direction of the axis line of said rotational axis is formed;

a channel that is attached to the inner circumferential surface of said peripheral portion and where a classification flow path for causing field flow fractionation by means of a centrifugal force is created;

a flow path for feeding a sample liquid into said classification flow path;

a flow path for feeding a sample liquid out from said classification flow path; and a rotational drive mechanism for rotating said rotational axis, wherein a channel installation portion having said inner circumferential surface formed is formed on one side of the peripheral portion of said rotor, and a mass balancer portion for adjusting the mass distribution of said rotor is formed on the other side with said rotor base in between, the mass of said mass balancer portion is adjusted in such a manner that the mass distribution of the rotor is equal between the left and the right with said rotor base in between in the state where said channel is attached to said channel installation portion;

wherein said channel installation portion and said mass balancer portion are formed so as to be symmetric with the rotor base in between, and a balancer member of which the mass distribution is equal to that of said channel is installed in said mass balancer portion; and the balancer member is a dummy ring.

2. A field flow fractionation device, comprising:

a rotor having: a rotor base that is supported by a rotational axis, that spreads in the direction of the diameter from said rotational axis, and has a circular outer periphery; and a peripheral portion that is provided along the outer periphery of said rotor base and where an inner circumferential surface that is parallel to the direction of the axis line of said rotational axis is formed;

a channel that is attached to the inner circumferential surface of said peripheral portion and where a classification flow path for causing field flow fractionation by means of a centrifugal force is created;

a flow path for feeding a sample liquid into said classification flow path;

a flow path for feeding a sample liquid out from said classification flow path; and a rotational drive mechanism for rotating said rotational axis, wherein a channel installation portion having said inner circumferential surface formed is formed on one side of the peripheral portion of said rotor, and a mass balancer portion for adjusting the mass distribution of said rotor is formed on the other side with said rotor base in between, and the mass of said mass balancer portion is adjusted in such a manner that the mass distribution of the rotor is equal between the left and the right with said rotor base in between in the state where said channel is attached to said channel installation portion;

wherein the thickness of said peripheral portion distributes in the direction of the diameter in such a manner that the center is thicker and the left and right ends are thinner.

3. The field flow fractionation device according to claim 2, wherein said channel installation portion and said mass balancer portion are formed so as to be symmetric with the rotor base in between, and a balancer member of which the mass distribution is equal to that of said channel is installed in said mass balancer portion.

4. The field flow fractionation device according to claim 2, wherein the peripheral portion of said rotor is formed so as to be asymmetric with the rotor base in between by adding an equivalent mass that corresponds to the mass of said channel to the peripheral portion on said mass balancer portion side.

* * * * *